Jan. 28, 1964

W. BOCK ETAL 3,119,411

VALVED T-PIPE JOINT, PARTICULARLY FOR
WINDSHIELD WASHING APPARATUS
Filed Nov. 7, 1958

INVENTOR.
WILLY BOCK
BY ALFRED KOHLER
RUDI PLOG

Dicke and Craig
ATTORNEYS

United States Patent Office 3,119,411
Patented Jan. 28, 1964

3,119,411
VALVED T-PIPE JOINT, PARTICULARLY FOR WINDSHIELD WASHING APPARATUS
Willy Bock and Alfred Kohler, Bietigheim, Wurttemberg, and Rudi Plog, Ludwigsburg, Wurttemberg, Germany, assignors to SWF-Spezialfabrik für Autozubehör Gustav Rau G.m.b.H., Bietigheim, Wurttemberg, Germany
Filed Nov. 7, 1958, Ser. No. 772,506
Claims priority, application Germany Dec. 21, 1957
1 Claim. (Cl. 137—525.3)

The present invention relates to a pipe joint, and more particularly to a T pipe joint which is intended as an accessory for winshield washing apparatus for automatic vehicles.

It is an object of the present invention to provide a new type of pipe joint which preferably consists of a plastic material and permits a connecting piece to be firmly attached and locked thereto automatically merely by the insertion of one piece into the other.

For attaining this object, the invention provides the pipe joint with an inner shoulder serving as a seat or end stop against which the connecting piece abuts when inserted into the open end of the pipe joint. The invention further provides the connecting piece with a special tongue and groove connection between the pipe joint and the connecting piece which consists of an outer peripheral bulge on the connecting piece at a point spaced at a certain distance from its end, and an inner peripheral groove on the outer end of the pipe joint and of a shape closely corresponding to the shape of the bulge. When the connecting piece is then inserted into the pipe joint, the bulge on the connecting piece will temporarily expand the grooved end of the plastic pipe joint until the end surface of the connecting piece engages with the shoulder in the pipe joint, while at the same time the grooved end of the pipe joint will snap over the outer edge of the bulge and thus lock the two parts securely and substantially rigidly to each other.

A further object of the invention is to provide a pipe joint as above described which also serves as a housing of a resilient valve disk which may be seated between the end surface of the connecting piece and the shoulder at the inside of the pipe joint. This valve disk will then serve not only its primary function as an inlet or outlet check valve but also as a sealing washer between the end surface of the connecting piece and the shoulder at the inside of the pipe joint.

A further object of the present invention is to provide a pair of pipe joints of the type as described above to form parts of a T pipe joint which is especially designed for connecting the liquid container and the spraying nozzles of a windshield washing apparatus to the pump thereof, and to provide the mentioned valve disks in two of the three branches of the T joint so as alternately to connect the pump, which is connected to the third branch, either to the liquid container or to the spraying nozzles. Thus, by means of the T joint and the two valves therein, the pump will first draw the liquid from the container during its suction stroke and then pass the liquid under pressure to the spraying nozzles during the following compression stroke.

In order to serve both as a valve and as a sealing washer, each valve disk is made of a resilient material, for example, rubber, and a central portion of such disk is partly severed from the outer marginal portion thereof so as to serve as a flap valve, while the marginal portion is to be clamped between the shoulder in one of the branches of the T joint and the end surface of one of the connecting pieces leading to the liquid container or the spraying nozzles, respectively, and thus serves as a sealing washer between the adjacent surfaces. The sealing action of these washers is, according to the invention, simply attained by making the interengaging parts of each pipe joint or branch of the T joint and of the respective connecting piece of the proper dimensions so that, when the two parts are fitted over or into each other and are in inter-locking engagement with each other, they also automatically compress the marginal portion of the valve disk and thereby seat the valve disk securely and also prevent any seepage of liquid past the closed flap valve or between the interconnected parts of the joint.

The entire T joint according to the invention including the connecting pieces preferably consists of a synthetic plastic of considerable stability and just sufficient resilience to permit the open ends of the two branches of the T joint to expand while the connecting pieces are inserted therein, and then to snap back into their former shape when the outer end portions of the two branches snap over the bulges on the connecting pieces. The inner dimensions of the connecting pieces may be made so alike that, when they are in interlocking engagement, they will fit so tightly as practically to leave no intermediate seam. Such a tight fit may even be increased by resorting to the slight resilience of the plastic material and by making the outer dimensions of the connecting pieces slightly larger than the inner dimensions of the two branches of the T joint so that, after the respective parts are in interlocking engagement, they will also be practically shrunk on each other.

These and other objects, features, and advantages of the present invention will also appear from the following detailed description thereof, particularly when read with reference to the accompanying drawings, in which—

FIGURE 2 shows a perspective view of one of the hose connecting pieces with a flap valve thereon; while

Figure 3:
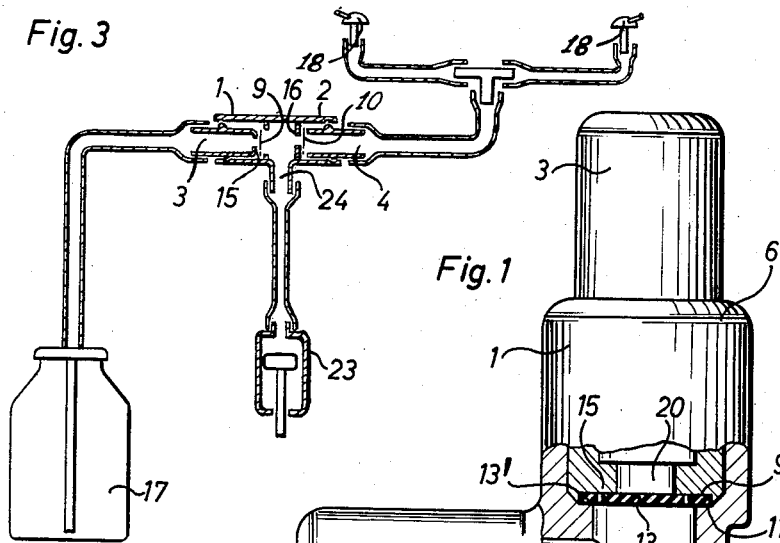
FIGURE 3 shows a diagrammatic view of the T pipe joint according to the invention as applied to a windshield washing apparatus.
Figure 1:
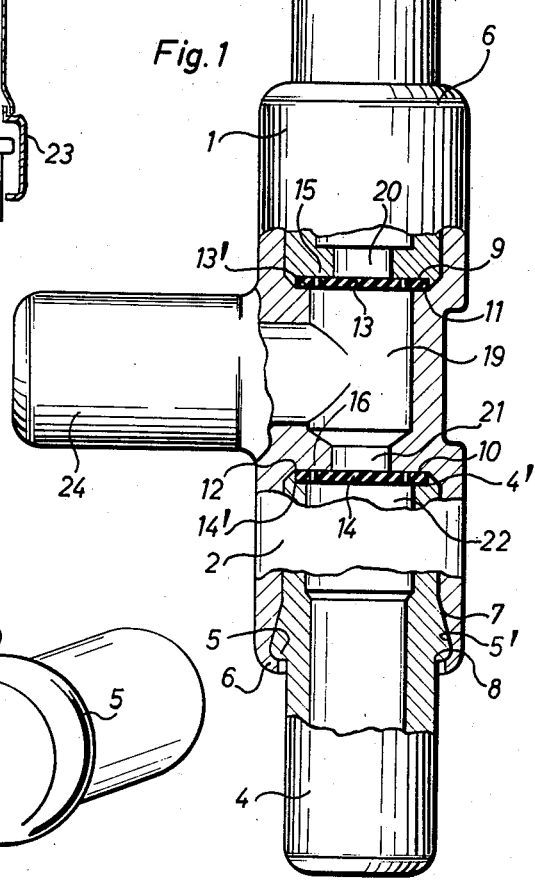
FIGURE 1 shows, partly in cross section, a side view of a pipe joint according to the invention.
Figure 2:
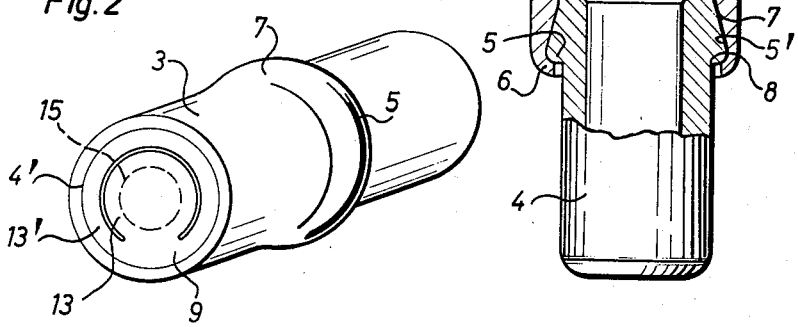

Referring to the drawings, the T pipe joint according to the invention has a pair of opposite socketlike branches 1 and 2 of a greater outer diameter than the hose connections 3 and 4 which are to be inserted therein. Each of these connecting pieces 3 and 4 is substantially cylindrical and has a peripheral bulge 5 at a certain distance from the inner end thereof, and the side 7 of bulge 5 facing toward such inner end tapers gradually or substantially conically down to the normal diameter of the connecting piece, while the outer side 8 is disposed substantially at a right angle to the cylindrical outer surface of the connecting piece. Each pipe branch 1 and 2 on the other hand has near its outer end an inner groove 5' of a shape closely corresponding to the shape of bulge 5 and terminating in a liplike end portion 6 which, when the front end of the respective connecting piece 3 or 4 engages with the bottom flange of the socket 1 or 2, overlaps bulge 5 and tightly grips the rear edge 8 thereof. As shown by FIGURE 1, lip member 6 has a thickness relatively less than the thickness of the remainder of the member 2, this thickness being substantially uniform in directions substantially parallel to its axis. The inner ends of connecting pieces 3 and 4 which, as illustrated in FIGURE 3 are to be connected by a hose to a liquid container 17 and nozzles 18, respectively, are each provided with a shallow annular recess 4' in which a valve disk 9 or 10 is seated. As shown particularly in FIGURE 1, these inner ends comprise cylindrical surfaces in contact with interior surfaces of sockets 1 and 2. As also shown in this figure, bulge 5 forms an obtuse angle with the cylindrical surface of socket 2. Valves 9 and 10 each consist of a circular disk of rubber or similar resilient material in which an almost completely circular cut is made to sever the central portion 13 or 14 from the outer annular portion 13' or 14' except for a small portion through which the central portion is hinged to the outer annular portion. Thus, the central circular portion 13 or 14 forms a flap valve, while the outer annular portion 13' or 14' serves as a washer which, when the connecting piece 3 or 4 is locked in socket 1 or 2, is compressed between the bottom of the recess 4' and a shoulder 11 or 12 at the bottom of the socket. As clearly shown in FIGURE 1, adjacent to valve 13 and 14, respectively, pipe socket 1 has a large inner bore 19 and connecting piece 3 has a smaller inner bore 20, while pipe socket 2 has a smaller inner bore 21 and connecting piece 4 has a larger inner bore 22. Consequently, the central part 13 of flap valve 9 can rest on a valve seat formed by a shoulder 15 on the inner end of connecting piece 3 and open inwardly toward pump 24 while the central part 14 of flap valve 10 can rest on a valve seat formed by a shoulder 16 on the bottom of socket 2 and open outwardly toward nozzles 18 as shown in FIGURE 3. Thus, during the suction stroke of pump 23 which is connected by a hose to the third branch 24 of the T joint, valve 9 opens toward the inside while valve 10 remains closed, permitting the liquid to be drawn from container 17 toward the pump, while during the compression stroke of pump 23, valve 9 will be closed and valve 10 opened, so that the liquid previously drawn from container 16 will be pumped toward and through nozzles 18.

By providing the slightly tapering surfaces of bulge 5 on each of the connecting pieces 3 and 4 and of groove 5' in the outer end of each pipe socket 1 and 2, the connecting pieces may be inserted into the socket quite easily. After they have once been fully inserted and locked therein, their connection to the sockets is even more secure than that of a normal screw connection.

By the use of a suitable plastic material, the adjacent engaging surfaces of the connecting pieces and socket walls may be made to cling upon each other at any desired degree of tenacity. In order to permit a relatively easy removal of the connecting pieces from the T joint, the outer diameter of the connecting pieces and the inner diameter of the socket walls may be made equal. A special tool may then be applied for spreading the lip portion 6 so as to be able to slip over the bulge 5 while at the same time a tension is applied on the respective connecting piece 3 or 4 to pull it out of the pipe socket. This may be advisable to allow a replacement of valves 9 and 10 in the event that one or the other might be defective. Still, the connection between the respective parts is foolproof since a separation thereof cannot occur accidentally or be carried out by a person who is not in the possession of the required spreading tool. However, if desired, the two parts may also be interconnected so firmly as to be practically integral with each other and virtually inseparable from each other by making the outer diameter of the connecting pieces slightly greater than the inner diameter of the socket walls.

Although in the above description and in the accompanying drawings, we have shown the hose connections as being inserted into the socketlike branches of the T joint, it is obvious that the shape, dimensions, and relative positions of the respective parts may be reversed so that the hose connections slip over the two branches of the T joint, in which event the valve disks 9 and 10 are preferably fitted in recesses in the outer ends of the two branches similar to recesses 4' in the ends of the hose connections, as shown in the drawings. Also, the relative position of the parts of the tongue-and-groove connection between each pipe socket and hose connection may be exchanged, in that, for example, the tapered groove may be provided in the outer surface of the connecting piece and an inner annular tooth or bulge near the outer end of the pipe socket. Naturally, the taper of this bulge and groove must also be reversed to that shown in the drawings in order to attain a secure locking action.

Although our invention has been illustrated and described with reference to the preferred embodiments thereof, we wish to have it understood that it is in no way limited to the details of such embodiments, but is capable of numerous modifications within the scope of the appended claim.

Having thus fully disclosed our invention, what we claim is:

A valve comprising a tubular housing consisting of a male member and a female member adapted to assume assembled positions, at least one of said members substantially consisting of a plastic material and having an annular tongue and the other member having an annular groove, said tongue and said groove being adapted for interlocking engagement, one side of said tongue and one side of said groove being tapered so as to permit an easy insertion of said male member into said female member, said female member having an end portion constituted by a resilient annular lip member, said lip member being disposed in the path of said other member and adapted to yield resiliently to said other member during said insertion, said resilient lip member comprising the other side of said annular groove, the other side of said tongue and said other side of said groove being substantially perpendicular to the axis of the respective member, said male member having a shallow annular recess in its outer end, a valve disk of resilient material forming a flap valve being inserted into said recess, said female member having an inner annular shoulder integral therewith, said recess being spaced from the said other side of said tongue by a distance such that said valve disk is secured in operative position between the walls of said recess in the end of said male member and said shoulder in said female member when said two members are inserted into each other and said tongue and groove are interlocked with each other, said first- and second-named sides being in engagement and said perpendicular sides being in engagement when said members are in said assembled positions, said resilient annular lip member having a resilience sufficiently low as to maintain said male member and said female member in said assembled positions but sufficiently high as to enable said resilient member to yield during said assembly, said resilient annular lip member constituting the sole means for resisting movement of said valve disk from said operative position and for resisting relative separting movements of said members from said assembled positions.

References Cited in the file of this patent
UNITED STATES PATENTS

| | | |
|---|---|---|
| 89,023 | Bulkey | Apr. 20, 1869 |
| 366,244 | Pelletier | July 12, 1887 |
| 2,592,130 | Erb | Apr. 8, 1952 |
| 2,717,556 | Bartoo | Sept. 13, 1955 |
| 2,717,619 | Whitman | Sept. 13, 1955 |
| 2,889,089 | Herrick | June 2, 1959 |

FOREIGN PATENTS

| | | |
|---|---|---|
| 546,199 | Great Britain | of 1942 |
| 897,567 | France | of 1945 |